(No Model.)
R. B. PERKINS.
Lantern.
No. 232,295. Patented Sept. 14, 1880.
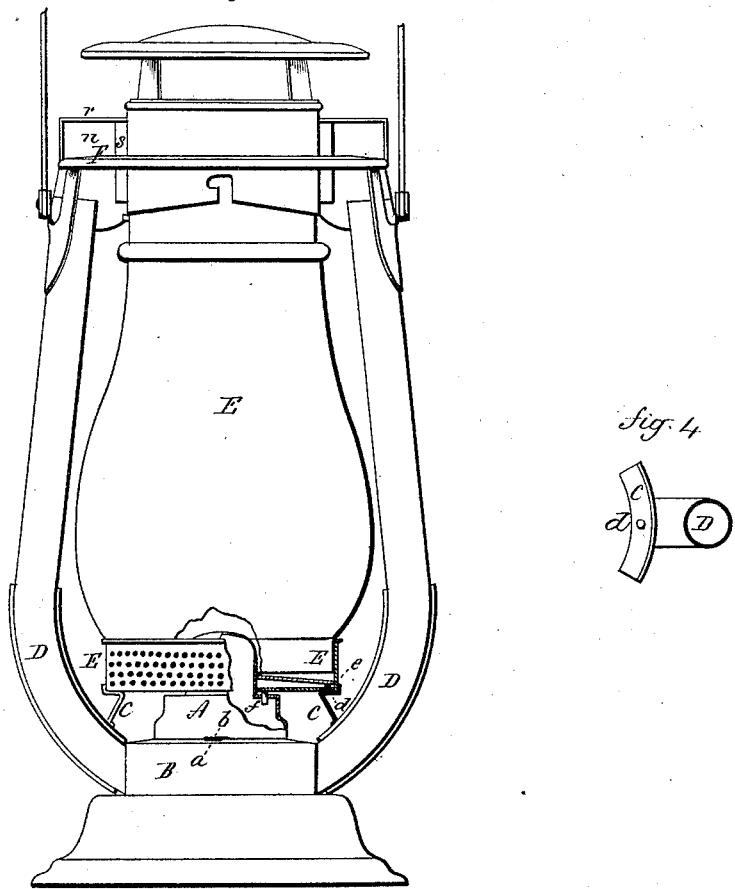
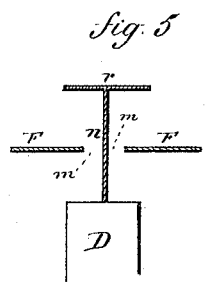
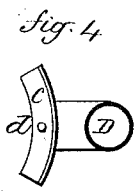
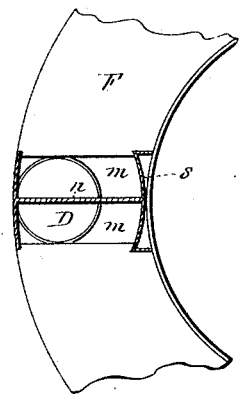
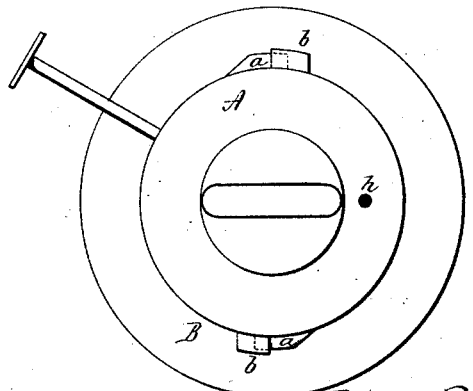
Witnesses:
Russell B. Perkins
Inventor

UNITED STATES PATENT OFFICE.

RUSSELL B. PERKINS, OF MERIDEN, CONNECTICUT, ASSIGNOR TO EDWARD MILLER & CO., OF SAME PLACE.

LANTERN.

SPECIFICATION forming part of Letters Patent No. 232,295, dated September 14, 1880.

Application filed May 6, 1880. (No model.)

*To all whom it may concern:*

Be it known that I, RUSSELL B. PERKINS, of Meriden, in the county of New Haven and State of Connecticut, have invented a new Improvement in Lanterns; and I do hereby declare the following, when taken in connection with the accompanying drawings and the letters of reference marked thereon, to be a full, clear, and exact description of the same, and which said drawings constitute part of this specification, and represent, in—

Figure 1, a side view; Figs. 2, 3, 4, 5, detached views.

This invention relates to an improvement in what are commonly known as "tubular lanterns," having for its object a better direction for the currents of air into the tube under all circumstances, and also to properly locate and support the globe at the base; and the invention consists in the construction, as hereinafter described, and particularly recited in the claims.

In previous constructions the burner-cone has been arranged so as to be held in place by the globe—that is, the globe-holder rested directly on the cone and depended upon the downward pressure on top of the globe to hold it in place; hence, so soon as the globe is removed, the cone is liable to be displaced, and is also liable to be displaced when setting the globe upon it. To overcome this difficulty I construct the cone A with a lug, $a$, on opposite sides, projecting in a horizontal plane, and the top of the air-chamber B with corresponding catches $b$, beneath which the lugs $a$ are turned when the cone is set in place, and, as seen in Fig. 2, the lugs $a$ fitting sufficiently close to securely hold the cone.

At each side a bracket, C, is arranged upon the air-tubes D, and onto which a globe-holder, E, sets, the seat on the brackets being so as to leave a clear space between the globe-holder and the cone, and curved, as seen in Fig. 4, corresponding to the circle of the globe-holder, so as to locate the globe and retain it in its proper central position. The globe E is placed thereon and then secured above in the usual manner. Thus all possible contact between the globe-holder and the cone or burner is avoided, as well as their dependence one upon the other for location or support.

As represented in Fig. 1, the bottom of the holder consists of a lower horizontal wall perforated and a wall above it slightly inclined thereto, extending from the outside inward toward the cone.

To prevent the globe-holder from turning, a stud, $d$, is arranged on one of the brackets, with a corresponding perforation, $e$, in the globe-holder, as seen in Fig. 1, and so that when set in place the globe-holder cannot be turned. This arrangement may be reversed—that is, the stud may be on the globe-holder and the perforation in the bracket.

A stud, $f$, is arranged upon the under side of the globe-holder to extend through a corresponding perforation, $h$, in the cone, or this stud and perforation may be reversed. This stud $f$ and perforation $h$ insure the proper securing of the cone before the globe is set in place, because, as the location of the globe-holder is fixed by the stud and perforation $d$ $e$, the stud $f$ cannot enter the perforation $h$ in the cone unless the cone be in its properly-secured position.

F is the horizontal dividing-plate above the mouth of the tubes D. A partition, $n$, extends from the mouth of the tubes upward through the plate F, there being an opening, $m$, in the plate F each side the partition $n$, this partition serving as a deflector to turn the air coming from either direction at right angles against the partition. While this partition deflects the air from certain directions only, other guards have been arranged at right angles thereto to deflect the currents coming from the direction of the plane of the partition; but a serious difficulty exists from irregular drafts produced by currents coming from other directions. To obviate this difficulty, a cap, $r$, is placed over the top of the partition, as seen in Fig. 5, and in rear—that is, near the body of the cap, and inside the tube—a wall or deflector, $s$, is arranged, curved or inclined from the partition outward toward the tube, as seen in Fig. 3, and extending down to near the mouth of the tube. (See Fig. 1.) The curved or inclined surfaces thus produced catch the current and insure its direction toward and against the partition n, and thence into the tube, and being alike on both sides of the lantern, a steady draft is insured irrespective of the direction from which the current may come.

I do not broadly claim one part of the lantern detachably connected to another part by means of radial projections on the one part and catches on the other part, as such, I am aware, is not new.

I claim—

1. In a lantern, the combination of the bracket C, extending inward from the air-tubes, and the globe-holder E, adapted to rest thereon independent of the burner or cone, substantially as described.

2. In a lantern, the combination of the bracket C, extending inward from the air-tubes, and the globe-holder E, adapted to rest thereon, and provided with a device interlocking with one or both the brackets, substantially as and for the purpose described.

3. In a lantern, the combination of the brackets C, globe-holder E, resting thereon, and the cone A, secured in its position independent of the globe-holder, a stud, f, on the globe-holder, and corresponding perforation in the cone, substantially as and for the purpose described.

4. In a lantern, the combination of the brackets C and globe-holder resting thereon, with an interlocking device between the two, the cone A, with stud f on the globe-holder, and corresponding perforation in the cone, substantially as and for the purpose described.

5. In a tubular lantern, the combination, with the open-mouth tube, of the horizontal plate above the mouth of the tubes, vertical partition n, extending from the mouth of the tubes through openings in and above the plate F, the cap r on the partition, and the walls s, curved or inclined inward and toward the partition n, substantially as and for the purpose described.

RUSSELL B. PERKINS.

Witnesses:
THOMAS LAYTHAM,
E. A. PERKINS.